United States Patent
Amir et al.

(10) Patent No.: US 10,157,280 B2
(45) Date of Patent: Dec. 18, 2018

(54) SYSTEM AND METHOD FOR IDENTIFYING SECURITY BREACH ATTEMPTS OF A WEBSITE

(75) Inventors: Idan Amir, Moshav Emunim (IL); Eyal Gruner, Jerusalem (IL); Boaz Zilber, Nes-Ziona (IL)

(73) Assignee: F5 Networks, Inc., Seattle, WA (US)

( * ) Notice: Subject to any disclaimer, the term of this patent is extended or adjusted under 35 U.S.C. 154(b) by 697 days.

(21) Appl. No.: 12/565,088

(22) Filed: Sep. 23, 2009

(65) Prior Publication Data

US 2011/0072262 A1 Mar. 24, 2011

(51) Int. Cl.
| | |
|---|---|
| *G06F 21/00* | (2013.01) |
| *H04L 9/32* | (2006.01) |
| *H04L 9/08* | (2006.01) |
| *G06F 21/57* | (2013.01) |
| *G06F 21/52* | (2013.01) |
| *G06F 21/55* | (2013.01) |
| *H04L 29/06* | (2006.01) |

(52) U.S. Cl.
CPC .............. *G06F 21/57* (2013.01); *G06F 21/52* (2013.01); *G06F 21/552* (2013.01); *H04L 63/145* (2013.01); *H04L 63/1416* (2013.01); *H04L 63/1483* (2013.01); *G06F 2221/2119* (2013.01)

(58) Field of Classification Search
CPC .............. H04L 63/1441; H04L 63/1483; H04L 63/1416; H04L 63/1425; H04L 63/1433; H04L 63/145; H04L 63/1466; H04L 63/166; H04L 63/20; H04L 63/08; H04L 67/02; H04L 63/0823; H04L 63/1408; H04L 63/0227; H04L 63/14; G06F 2221/2119; G06F 21/52; G06F 21/55; G06F 21/57; G06F 21/566; G06F 21/552; G06F 21/563

USPC .............................. 726/22–26; 709/224–225
See application file for complete search history.

(56) References Cited

U.S. PATENT DOCUMENTS

| | | | |
|---|---|---|---|
| 3,950,735 | A | 4/1976 | Patel |
| 4,644,532 | A | 2/1987 | George et al. |
| 4,897,781 | A | 1/1990 | Chang et al. |
| 4,965,772 | A | 10/1990 | Daniel et al. |
| 5,023,826 | A | 6/1991 | Patel |
| 5,053,953 | A | 10/1991 | Patel |
| 5,299,312 | A | 3/1994 | Rocco, Jr. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

Kevin Borders, Atul Prakash: "Web Tap: detecting covert web traffic"—Proceeding of the 11th ACM conference on Computer and Communications Security CCS'04, pp. 110-120, New York, 2004.*

(Continued)

*Primary Examiner* — Catherine B Thiaw
(74) *Attorney, Agent, or Firm* — LeClairRyan PLLC (57) ABSTRACT

The present invention is a method, circuit and system for detecting, reporting and preventing an attempted security breach of a commercial website (for example a banking website), such as identity theft, website duplication (mirroring/Phishing), MITB (man in the browser) attacks, MITM (man in the middle) attacks and so on.

12 Claims, 5 Drawing Sheets

(56) References Cited

U.S. PATENT DOCUMENTS

| | | |
|---|---|---|
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,085,320 A * | 7/2000 | Kaliski, Jr. ............ G06F 21/33 713/168 |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,223,287 B1 | 4/2001 | Douglas et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,535,912 B1 | 3/2003 | Anupam et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,552,199 B2 * | 6/2009 | Pomerantz ............ G06Q 10/06 434/118 |
| 7,558,197 B1 | 7/2009 | Sindhu et al. |
| 7,624,424 B2 | 11/2009 | Morita et al. |
| 7,712,132 B1 * | 5/2010 | Ogilvie ...................... 726/22 |
| 7,757,278 B2 | 7/2010 | Boneh et al. |
| 7,788,730 B2 * | 8/2010 | Dean et al. ................. 726/30 |
| 7,801,978 B1 | 9/2010 | Susai et al. |
| 7,857,002 B2 | 12/2010 | Reck |
| 7,916,728 B1 | 3/2011 | Mimms |
| 7,945,563 B2 * | 5/2011 | Seitz ........................ 707/722 |
| 7,966,553 B2 * | 6/2011 | Iverson ..................... 715/205 |
| 8,079,080 B2 * | 12/2011 | Borders .................... 726/22 |
| 8,090,816 B1 * | 1/2012 | Deshmukh et al. ......... 709/224 |
| 8,103,809 B1 | 1/2012 | Michels et al. |
| 8,112,491 B1 | 2/2012 | Michels et al. |
| 8,112,799 B1 * | 2/2012 | Loiodice et al. ............ 726/22 |
| 8,130,650 B2 | 3/2012 | Allen, Jr. et al. |
| 8,185,956 B1 * | 5/2012 | Bogorad et al. ............ 726/25 |
| 8,234,687 B2 * | 7/2012 | Baumhof .................... 726/1 |
| 8,291,497 B1 * | 10/2012 | Griffin et al. .............. 726/23 |
| 8,301,837 B1 | 10/2012 | Natarajan |
| 8,306,036 B1 | 11/2012 | Bollay |
| 8,346,993 B2 | 1/2013 | Michels et al. |
| 8,347,100 B1 | 1/2013 | Thornewell et al. |
| 8,356,352 B1 * | 1/2013 | Wawda et al. .............. 726/22 |
| 8,447,884 B1 | 5/2013 | Baumann |
| 8,537,825 B1 | 9/2013 | Mimms |
| 8,554,999 B2 | 10/2013 | Natarajan |
| 8,578,482 B1 * | 11/2013 | Yang et al. ................. 726/22 |
| 8,584,233 B1 * | 11/2013 | Yang et al. ................. 726/22 |
| 8,601,586 B1 * | 12/2013 | Boutros et al. ............ 726/25 |
| 8,769,681 B1 | 7/2014 | Michels et al. |
| 8,776,166 B1 * | 7/2014 | Erickson ............. H04L 63/083 726/1 |

(56) References Cited

U.S. PATENT DOCUMENTS

| | | |
|---|---|---|
| 8,856,898 B1 | 10/2014 | Thornewell et al. |
| 8,880,632 B1 | 11/2014 | Michels |
| 8,880,696 B1 | 11/2014 | Michels |
| 8,886,981 B1 | 11/2014 | Baumann et al. |
| 8,984,178 B2 | 3/2015 | Michels et al. |
| 9,020,912 B1 | 4/2015 | Majee et al. |
| 9,083,760 B1 | 7/2015 | Hughes et al. |
| 9,106,699 B2 | 8/2015 | Thornewell et al. |
| 9,141,625 B1 | 9/2015 | Thornewell et al. |
| 9,154,453 B2 | 10/2015 | Michels et al. |
| 9,231,879 B1 | 1/2016 | Wojcik |
| 9,246,819 B1 | 1/2016 | Thirasuttakorn |
| 9,294,502 B1 | 3/2016 | Benishti |
| 9,313,047 B2 | 4/2016 | Michels et al. |
| 9,436,820 B1* | 9/2016 | Gleichauf .............. G06F 21/50 |
| 9,444,839 B1* | 9/2016 | Faulkner .............. H04L 63/168 |
| 2001/0023442 A1 | 9/2001 | Masters |
| 2002/0059428 A1 | 5/2002 | Susai et al. |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0208562 A1 | 11/2003 | Hauck et al. |
| 2003/0225485 A1 | 12/2003 | Fritz et al. |
| 2004/0225877 A1* | 11/2004 | Huang ........................ 713/100 |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0144441 A1 | 6/2005 | Govindarajan |
| 2005/0154837 A1 | 7/2005 | Keohane et al. |
| 2005/0187866 A1 | 8/2005 | Lee |
| 2005/0188051 A1 | 8/2005 | Sneh |
| 2006/0005017 A1 | 1/2006 | Black et al. |
| 2006/0059267 A1 | 3/2006 | Cugi et al. |
| 2006/0075028 A1 | 4/2006 | Zager et al. |
| 2006/0075494 A1* | 4/2006 | Bertman ................ G06F 21/552 726/22 |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2006/0253581 A1 | 11/2006 | Dixon et al. |
| 2006/0259967 A1* | 11/2006 | Thomas et al. .................. 726/22 |
| 2007/0005984 A1* | 1/2007 | Florencio et al. ............. 713/178 |
| 2007/0016662 A1 | 1/2007 | Desai et al. |
| 2007/0016949 A1* | 1/2007 | Dunagan et al. .................. 726/22 |
| 2007/0039038 A1 | 2/2007 | Goodman et al. |
| 2007/0039050 A1 | 2/2007 | Aksenov et al. |
| 2007/0064661 A1 | 3/2007 | Sood et al. |
| 2007/0074169 A1* | 3/2007 | Chess et al. .................. 717/126 |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0124283 A1* | 5/2007 | Gotts et al. ........................ 707/3 |
| 2007/0143851 A1* | 6/2007 | Nicodemus ............. G06F 21/55 726/25 |
| 2007/0156592 A1* | 7/2007 | Henderson ............ G06Q 10/06 705/51 |
| 2007/0169191 A1* | 7/2007 | Greene et al. .................. 726/22 |
| 2007/0174491 A1 | 7/2007 | Still et al. |
| 2007/0180529 A1* | 8/2007 | Costea et al. ................ 726/24 |
| 2007/0208751 A1* | 9/2007 | Cowan et al. .................. 707/10 |
| 2007/0255953 A1 | 11/2007 | Peyret |
| 2007/0297551 A1 | 12/2007 | Choi |
| 2008/0010377 A1 | 1/2008 | Nissenboim |
| 2008/0034136 A1 | 2/2008 | Ulenas |
| 2008/0092242 A1* | 4/2008 | Rowley ............. H04L 63/1483 726/27 |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0201473 A1* | 8/2008 | Adelman et al. ............. 709/226 |
| 2008/0201599 A1 | 8/2008 | Ferraiolo et al. |
| 2008/0208957 A1* | 8/2008 | Ding ....................... H04L 41/00 709/203 |
| 2008/0229427 A1* | 9/2008 | Ramirez ............... G06F 21/566 726/26 |
| 2008/0244724 A1 | 10/2008 | Choe |
| 2008/0256224 A1 | 10/2008 | Kaji et al. |
| 2008/0281983 A1* | 11/2008 | Cooley et al. ................. 709/245 |
| 2008/0289047 A1 | 11/2008 | Benea et al. |
| 2008/0301760 A1 | 12/2008 | Lim |
| 2008/0320567 A1* | 12/2008 | Shulman et al. .................. 726/4 |
| 2009/0049230 A1 | 2/2009 | Pandya |
| 2009/0064337 A1* | 3/2009 | Chien ............................ 726/25 |
| 2009/0077383 A1* | 3/2009 | de Monseignat et al. .... 713/175 |
| 2009/0094671 A1* | 4/2009 | Kurapati, Sr. ...... H04L 63/1458 726/1 |
| 2009/0119769 A1* | 5/2009 | Ross et al. ..................... 726/13 |
| 2009/0125625 A1 | 5/2009 | Shim et al. |
| 2009/0138749 A1 | 5/2009 | Moll et al. |
| 2009/0138937 A1* | 5/2009 | Erlingsson et al. ............. 726/1 |
| 2009/0141891 A1 | 6/2009 | Boyen et al. |
| 2009/0172396 A1 | 7/2009 | Gabel et al. |
| 2009/0182818 A1* | 7/2009 | Krywaniuk ............ H04L 51/12 709/206 |
| 2009/0228956 A1 | 9/2009 | He et al. |
| 2009/0271866 A1* | 10/2009 | Liske .............................. 726/23 |
| 2009/0287935 A1 | 11/2009 | Aull et al. |
| 2009/0300749 A1* | 12/2009 | Delia et al. ..................... 726/12 |
| 2009/0319769 A1 | 12/2009 | Betouin et al. |
| 2010/0017880 A1* | 1/2010 | Masood .......................... 726/24 |
| 2010/0023582 A1 | 1/2010 | Pedersen et al. |
| 2010/0058479 A1* | 3/2010 | Chen ...................... G06F 21/54 726/26 |
| 2010/0100725 A1 | 4/2010 | Ozzie |
| 2010/0106767 A1* | 4/2010 | Livshits et al. ............... 709/203 |
| 2010/0107247 A1* | 4/2010 | Shani ............................ 726/22 |
| 2010/0122091 A1 | 5/2010 | Huang et al. |
| 2010/0150154 A1 | 6/2010 | Viger et al. |
| 2010/0169475 A1* | 7/2010 | Woundy ............. H04L 41/0896 709/224 |
| 2010/0205215 A1* | 8/2010 | Cook et al. ..................... 707/781 |
| 2010/0229223 A1* | 9/2010 | Shepard ................ G06F 21/31 726/5 |
| 2010/0251330 A1 | 9/2010 | Kroeselberg et al. |
| 2010/0257354 A1 | 10/2010 | Johnston et al. |
| 2010/0275014 A1 | 10/2010 | Kelley |
| 2010/0275024 A1 | 10/2010 | Abdulhayoglu |
| 2010/0281536 A1* | 11/2010 | Richards et al. ............... 726/22 |
| 2010/0281563 A1 | 11/2010 | Richards et al. |
| 2010/0306850 A1* | 12/2010 | Barile ................. G06F 21/566 726/25 |
| 2010/0313266 A1* | 12/2010 | Feng ..................... G06F 21/566 726/23 |
| 2010/0325277 A1 | 12/2010 | Muthiah et al. |
| 2010/0333167 A1* | 12/2010 | Luo et al. ........................ 726/1 |
| 2011/0047620 A1 | 2/2011 | Mahaffey et al. |
| 2011/0066718 A1 | 3/2011 | Susai et al. |
| 2011/0173295 A1 | 7/2011 | Bakke et al. |
| 2011/0282997 A1 | 11/2011 | Prince |
| 2011/0321122 A1 | 12/2011 | Mwangi et al. |
| 2012/0144490 A1* | 6/2012 | Hartrell et al. ................. 726/24 |
| 2012/0174196 A1 | 7/2012 | Bhogavilli |
| 2012/0198552 A1* | 8/2012 | Alagna et al. ................. 726/23 |
| 2012/0233694 A1* | 9/2012 | Baliga et al. .................. 726/23 |
| 2013/0212240 A1 | 8/2013 | Thornewell et al. |
| 2015/0052252 A1 | 2/2015 | Gilde et al. |
| 2015/0096020 A1 | 4/2015 | Adams |
| 2015/0121060 A1 | 4/2015 | Mimms et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |

(56) References Cited

FOREIGN PATENT DOCUMENTS

| WO | WO 99/06913 | 2/1999 |
|---|---|---|
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"A Process For Selective Routing of Servlet Content To Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"Servlet/Applet/HTML authentication process with single sign-on," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"Windows Server 2003 Kerberos Extensions," Microsoft TechNet, 2003 (Updated Jul. 31, 2004), http://technet.microsoft.com/en-us/library/cc738207, Microsoft Corporation.

Abad, Cristina L., and Rafael I. Bonilla. "An analuysis on the schemes for detecting and preventing ARP cache poisoning attacks." Distributed Computing System Workshops, 2007. ICDCSW'07. 27th International Conference on. IEEE, 2007.

ColonelPanic: Browser plugins vs extension—the difference, retrieved from http://colonelpanic.net/2010/08/browser-plugins-vs-extensions-the-difference.

Crescendo Networks, "Application Layer Processing (ALP)," 2003-2009, pp. 168-186, Chapter 9, CN-5000E/5500E, Foxit Software Company.

Dhamija et al: "The battle against phishing: dynamic secuirty skinds"—Symposium On Usable Privacy and Security, (SOUPS), Jul. 6-8, 2005, Pittsburgh, PA. USA.

F5 Networks Inc., "Configuration Guide for Local Traffic Management," F5 Networks Inc., Jan. 2006, version 9.2.2, 406 pgs.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

Macvittie, Lori, "Message-Based Load Balancing," Technical Brief, Jan. 2010, pp. 1-9, F5 Networks, Inc.

Mehra et al. Mitigating Denial of Service attack using CAPCHA Mechanism, 2011.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

* cited by examiner

Fig. 4

SYSTEM AND METHOD FOR IDENTIFYING SECURITY BREACH ATTEMPTS OF A WEBSITE

FIELD OF THE INVENTION

This invention generally relates to website security. More specifically, this invention relates to a system and method for identifying security breach attempts of a website.

BACKGROUND

In February 2005, Joe Lopez, a businessman from Florida, filed a suit against Bank of America after unknown hackers stole $90,000 from his Bank of America account. The money had been transferred to Latvia.

An investigation showed that Mr. Lopez's computer was infected with a malicious program, "Backdoor Coreflood", which records every keystroke and sends this information to malicious users via the Internet. This is how the hackers got hold of Joe Lopez's user name and password, since Mr. Lopez often used the Internet to manage his Bank of America account. Joe Lopez's losses were caused by a combination of overall carelessness and an ordinary keylogging program.

The term 'keylogger' itself is neutral, and the word describes the program's function. Most sources define a keylogger as a software program designed to secretly monitor and log all keystrokes.

Legitimate programs may have a keylogging function which can be used to call certain program functions using "hotkeys," or to toggle between keyboard layouts (e.g. Keyboard Ninja). There is a lot of legitimate software which is designed to allow administrators to track what employees do throughout the day, or to allow users to track the activity of third parties on their computers. The ethical boundary, however, between justified monitoring and espionage is a fine line. Legitimate software is often used deliberately to steal confidential user information such as passwords.

Moreover, the justifications listed above are more subjective than objective; the situations can all be resolved using other methods. Additionally, any legitimate keylogging program can still be used with malicious or criminal intent. Today, keyloggers are mainly used to steal user data relating to various online payment systems, and virus writers are constantly writing new keylogger Trojans for this very purpose.

Furthermore, many keyloggers hide themselves in the system (i.e. they have rootkit functionality), which makes them fully-fledged Trojan programs. As such programs are extensively used by cyber criminals, detecting them is a priority for antivirus companies.

In the field of computer security, phishing is the criminally fraudulent process of attempting to acquire sensitive information such as usernames, passwords and credit card details by masquerading as a trustworthy entity in an electronic communication. Communications purporting to be from popular social web sites, auction sites, online payment processors or IT Administrators are commonly used to lure the unsuspecting public. Phishing is typically carried out by e-mail or instant messaging, and it often directs users to enter details at a fake website whose look and feel are almost identical to the legitimate one. Even when using server authentication, it may require tremendous skill to detect that the website is fake. Phishing is an example of social engineering techniques used to fool users, and exploits the poor usability of current web security technologies. Attempts to deal with the growing number of reported phishing incidents include legislation, user training, public awareness, and technical security measures.

SUMMARY OF THE INVENTION

According to some embodiments of the present invention, there is provided a website security system, for detecting security breach attempts associated with Trojan applications residing on a client computer, comprised of one or more of the following components:

1. a code of a website;
2. an anti-trojan software module, functionally associated with the code of the website. The anti-trojan software module may be adapted to monitor, when instanced on a client computer, one or more communications between the client computer and the website and to detect differences between one or more parameters of the communications, such as the size of the communication, and the expected parameters of a communication of the type in question. The anti-trojan software module may be further adapted to send a message to a server associated with the website, in the event there is a difference between one or more parameters of a communication and the expected parameters of a communication of the type in question; and
3. a server which may be adapted to provide a client computer with the website code and the software module.
4. a server associated with the website, which server may be adapted to modify user account permissions in response to receiving a message from the software module, relating to the user account.

According to some further embodiments of the present invention, there is provided a website security system, for detecting security breach attempts associated with a phishing scheme, comprised of one or more of the following components:

1. a code of a first website;
2. an anti-phishing software module, functionally associated with the code of the first website. The anti-phishing software module may be adapted to detect its own instancement on a server not associated with the first website and, when it detects its own instancement on a server not associated with the first website, may be further adapted to perform one or more of the actions selected from the group of actions consisting of: (a) sending a warning to the first website's proprietor, (b) sending a warning to the supplier of the software module, (c) sending a warning to an investigative body, (d) reporting the IP address of the unassociated server to the first website's proprietor (e) reporting the IP address of the unassociated server to the supplier of the software module, (f) reporting the IP address of the unassociated server to an investigative body, (g) reporting further details relating to the instancement to the supplier of the software module, (h) reporting further details relating to the instancement to the first website's proprietor, and (i) reporting further details relating to the instancement to an investigative body; and
3. a server which may be adapted to provide a client computer with the website code and the software module.
4. a second software module, functionally associated with said first website and adapted to scan other websites and to report other websites containing graphics or text patterns similar to those contained in the first website.

The second software module may be further adapted to target for scanning, websites selected from the group of websites consisting of: (a) websites with new domain names, (b) websites with domain names that have recently changed ownership, and (c) websites with domain names similar to the first website's domain name.

5. a third software module, functionally associated with the first website and which third software module may be adapted to scan emails and to report emails masquerading as an email being sent by the proprietor of the first website.

According to some further embodiments of the present invention, The website security system, for detecting security breach attempts associated with a phishing scheme, may further comprise a file, such as an image file, stored on a server associated with the website, which file may not be part of the code that is sent to a browser when it navigates to the website. Accordingly, the anti-phishing software module may be further adapted to locate said file every time it is instanced and to determine that it has been instanced on a server, not associated with said website, when it cannot locate the file.

According to yet further embodiments of the present invention, there is provided a website security system, for detecting security breach attempts associated with a man in the browser scheme, comprised of one or more of the following components:

1. a code of a website;
2. an anti-mib software module, functionally associated with the code of the website and adapted to encrypt user information, at the application level, using a changing public encryption key associated with the website. The anti-mib software module may be further adapted to receive a public encryption key upon being served to and/or upon instancement on a client browser. According to yet further embodiments of the present invention, the anti-mib software module may be adapted to create a public encryption key upon being served to a client browser; and
3. a server which may be adapted to provide a client computer with the website code and the software module.

According to some further embodiments of the present invention, there is provided a website security system, for detecting security breach attempts associated with a pharming scheme, comprised of one or more of the following components:

1. a code of a first website;
2. an anti-pharming software module, functionally associated with the code of the first website. The anti-pharming software module may be adapted to, when instanced on a client computer, monitor one or more parameters of a communication link between the client computer and a server of a website with which the user's browser is communicating, and to detect differences between the one or more parameters of the communication link and expected parameters for a link with a server associated with the first website.

The one or more parameters being monitored by the anti-pharming software module may include: (a) the domain name, (b) the IP address associated by the user's browser with the domain name, (c) the communication protocol, (d) the authenticity of the digital certificate being presented to the user's browser by the server with which it is communicating, and/or (e) the content of the digital certificate being presented to the user's browser by the server with which it is communicating.

According to further embodiments of the present invention, the anti-pharming software module may be adapted, when it detects differences between said one or more parameters of the communication link and expected parameters for a link with a server associated with the first website, to perform one or more of the following actions: (a) terminate the communication, (b) report the detection to the user, (c) report the detection to the first website operator, (d) report the detection to the supplier of the software module, (e) report the detection to an investigative body, (f) send information relating to the server with which the user's browser is communicating to the user, (g) send information relating to the server with which the user's browser is communicating to the first website operator, (h) send information relating to the server with which the user's browser is communicating to an investigative body, and (i) send information relating to the server with which the user's browser is communicating to the supplier of the software module.

3. a server which may be adapted to provide a client computer with the website code and the software module.
4. a server associated with the first website which may be adapted to modify user account permissions in response to receiving a message from the software module.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The term server may refer to a single server or to a functionally associated cluster of servers.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Terms in this application relating to distributed data networking, such as send or receive, may be interpreted in reference to Internet protocol suite, which is a set of communications protocols that implement the protocol stack on which the Internet and most commercial networks run. It has also been referred to as the TCP/IP protocol suite, which is named after two of the most important protocols in it: the Transmission Control Protocol (TCP) and the Internet Protocol (IP), which were also the first two networking protocols defined. Today's IP networking represents a synthesis of two developments that began in the 1970s, namely LANs (Local Area Networks) and the Internet, both of which have revolutionized computing.

The Internet Protocol suite—like many protocol suites—can be viewed as a set of layers. Each layer solves a set of problems involving the transmission of data, and provides a well-defined service to the upper layer protocols based on using services from some lower layers. Upper layers are logically closer to the user and deal with more abstract data, relying on lower layer protocols to translate data into forms that can eventually be physically transmitted. The TCP/IP reference model consists of four layers.

Layers in the Internet Protocol Suite

The IP suite uses encapsulation to provide abstraction of protocols and services. Generally a protocol at a higher level uses a protocol at a lower level to help accomplish its aims. The Internet protocol stack has never been altered, by the IETF, from the four layers defined in RFC 1122. The IETF makes no effort to follow the seven-layer OSI model and does not refer to it in standards-track protocol specifications and other architectural documents.

| 4. Application | DNS, TFTP, TLS/SSL, FTP, Gopher, HTTP, IMAP, IRC, NNTP, POP3, SIP, SMTP, SNMP, SSH, TELNET, ECHO, RTP, PNRP, rlogin, ENRP Routing protocols like BGP, which for a variety of reasons run over TCP, may also be considered part of the application or network layer. |
|---|---|
| 3. Transport | TCP, UDP, DCCP, SCTP, IL, RUDP |
| 2. Internet | Routing protocols like OSPF, which run over IP, are also to be considered part of the network layer, as they provide path selection. ICMP and IGMP run over IP and are considered part of the network layer, as they provide control information. IP (IPv4, IPv6) ARP and RARP operate underneath IP but above the link layer so they belong somewhere in between. |
| 1. Network access | Ethernet, Wi-Fi, token ring, PPP, SLIP, FDDI, ATM, Frame Relay, SMDS |

It should be understood that any topology, technology and/or standard for computer networking (e.g. mesh networks, infiniband connections, RDMA, etc.), known today or to be devised in the future, may be applicable to the present invention.

The present invention is a method and system for detecting, reporting and preventing an attempted security breach of a commercial website (for example a banking website), such as identity theft, website duplication (mirroring/Phishing), MITB (man in the browser) attacks, MITM (man in the middle) attacks and so on. According to some embodiments of the present invention, there may be provided an anti-trojan software module functionally associated with the website, such as embedded in a website's code, and adapted to detect when a computer of a user of the website is infected with a key logger or other Trojan application. According to further embodiments of the present invention, an anti-phishing software module may be embedded in the code of the website and may be adapted to transmit to a server associated with the website and/or a server associated with the entity responsible for the anti-phishing software module a warning message when the code of the website has been copied and/or instanced on a server other than the website's server, usually residing in a domain other than the native domain of the website, i.e. a phishing attempt. According to yet further embodiments of the present invention, an anti-pharming software module may be embedded in the website's code, which anti-pharming software module may be adapted to detect, report and/or prevent an attempt to intercept data (i.e. pharming) transferred from a user to the website, including authentication data.

Figure 1:
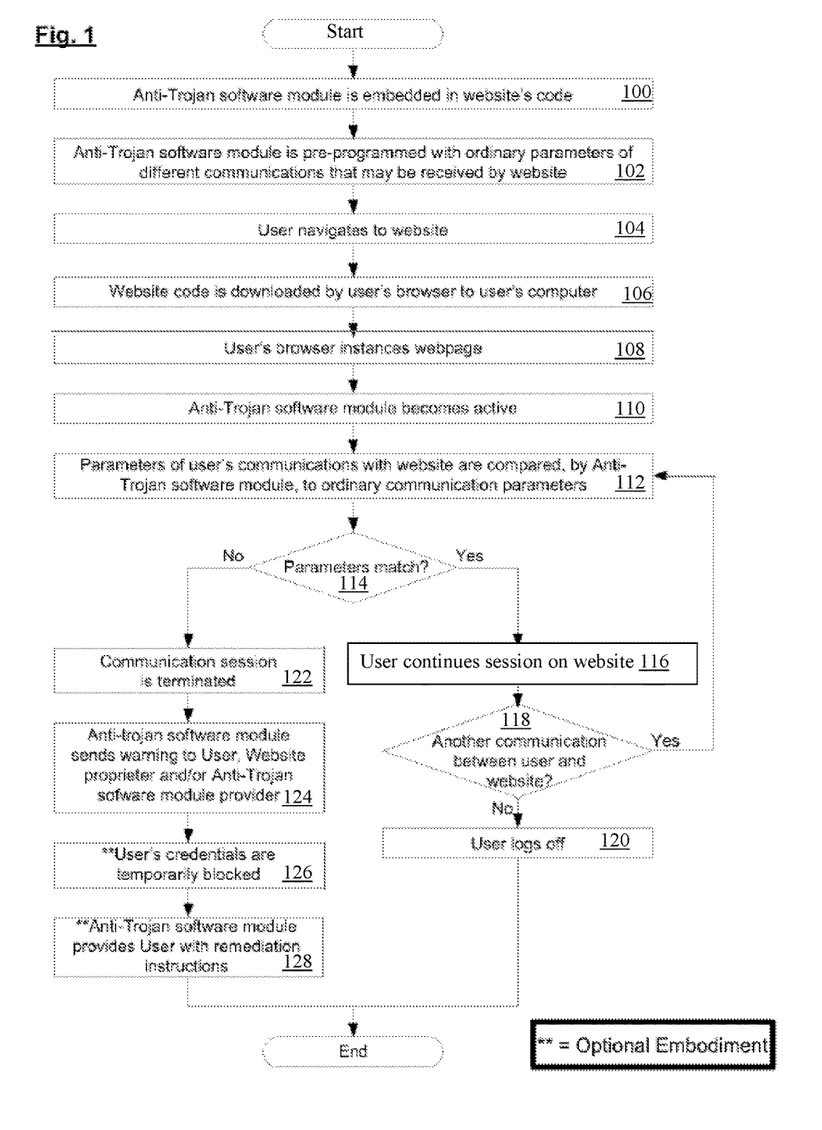
FIG. 1: shows a flowchart including exemplary steps of operation of an anti-trojan software module, in accordance with some embodiments of the present invention.

Referring to steps 100-128 of FIG. 1, according to some embodiments of the present invention, an anti-trojan software module functionally associated with the website is adapted to detect when a computer of a user of the website is infected with a key logger or other Trojan application. The anti-trojan software module may compare one or more parameters of communications between the user's computer to the website (e.g. the size of the communication, the number of user inputs included in the communication, the content of the communication, etc.) against expected parameters of a communication of the type in question. The anti-trojan software module may be pre-programmed with or receive from the website data indicating the expected parameters of the different communications that may be received by the website. The anti-trojan software module may, for example, check responses that are to be sent from a user's computer to the website server. If the responses' format, size, number of user inputs or other parameter is different from the ordinary size, format, number of user inputs or other parameter of such a type of response, a key logger or other Trojan application may be operative on the user's computer and may be attempting to record the user's credentials on the website or otherwise breach the system's security. Similarly, the anti-trojan software module may compare the contents of a specific communication (such as the contents of a specific page of the website) with the expected contents of the type of communication in question, the number of user inputs included in the communication and/or any other parameters of the communication. When discrepancies are discovered, the anti-trojan software module may terminate the communication session between the user's and the site and may further temporarily block the specific user from accessing the system utilizing the credentials that may have been compromised. Additionally, the anti-trojan software module may issue a warning to the user, the site operator and/or the anti-trojan software module provider. Furthermore, the anti-trojan software module may provide the user with remediation instructions for removing the key logger or other Trojan application from his/her computer and may further provide the user with instructions for reinstating his/her access to the system.

Figure 2:
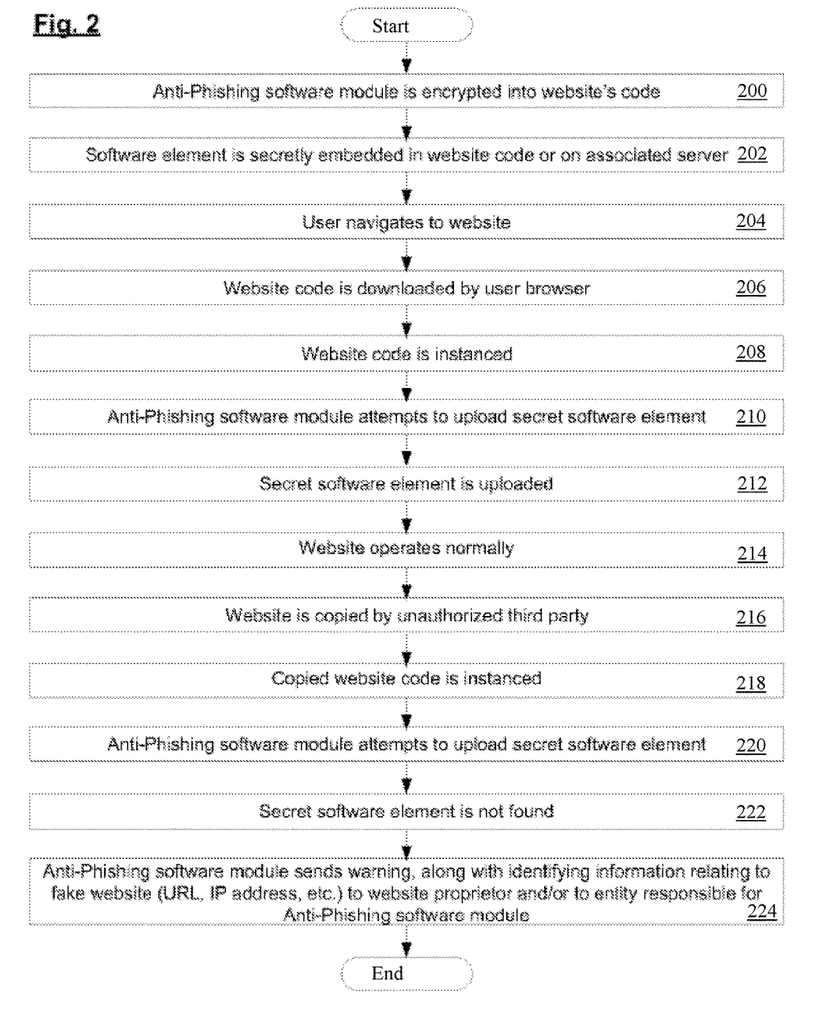
FIG. 2: shows a flowchart including exemplary steps of operation of an anti-phishing software module, in accordance with some embodiments of the present invention.

Referring to steps 200-224 of FIG. 2, according to further embodiments of the present invention, there may be provided an anti-phishing software module functionally associated with a commercial website, such as embedded in a website's code, adapted to identify attempts to copy the website on a different server in order to masquerade as the legitimate website (a "Phishing" attempt). According to some embodiments of the present invention, the anti-phishing software module may be encrypted into the website's code. The anti-phishing software module may simultaneously and/or separately perform multiple actions designed to identify Phishing attempts including; (i) verifying, every time the web page is loaded, a software element secretly embedded in the website's code or on an associated server, (ii) scanning similar domain names to search for possible imitations, (iii) monitoring new domain name registrations and/or changes of domain name ownership to search for possible imitations, (iv) searching throughout the internet for unique text patterns and graphics associated with the legitimate website, and/or (v) scanning emails to search for possible attempts to masquerade as the commercial entity being protected.

According to some embodiments of the present invention, the anti-phishing software module may be adapted to transmit to a server associated with the website and/or with the entity responsible for the anti-phishing software module a warning message when the code of the website has been copied and/or instanced on another server. The anti-phishing software module may be integral with one or more codes and/or modules of the website, such as a Javascript, a flash player application or any other application written in any other language. According to further embodiments of the present invention, the anti-phishing software module may, while running on the server and/or the browser, be adapted to check one or more parameters associated with its computational environment in order to determine whether it is communicating with the authentic/genuine website server or another server, unassociated with the authentic/genuine website—likely to be operated someone engaged in a phishing scheme. The anti-phishing software module may attempt to locate one or more specific files, which files may be secretly stored on the authentic/genuine website server, may not be part of the code that is sent to a browser when it navigates to the authentic/genuine website, and may thus be considered secret. The secret file(s) may be in the form of an image or digital certificate. For example, the genuine website may have a very small picture (up to one pixel in size) secretly embedded in a server associated with the website, which picture is not part of the code that is sent to a browser when it navigates to the authentic/genuine website. Therefore, when the website is copied the secret picture will not appear in the copy. The anti-phishing software module may, in this example, be programmed to attempt to locate the secret picture every time the website is uploaded and in the event that the picture cannot be located, presumably because the website is an illegitimate copy and therefore is being uploaded on a different server that does not contain the secret picture, send an alert along with the "fake" website's URL and/or the "different" server's IP address to a server associated with the genuine website and/or a server associated with the entity responsible for the anti-phishing software module.

According to further embodiments of the present invention, the anti-phishing software module may search the internet for websites containing unique text patterns and graphics associated with the legitimate website, such as the commercial entity's logo, marketing slogans, name, commonly used fonts and phrases and so on. The anti-phishing software module may target websites with domain names similar to the genuine website's domain name and/or monitor new domain name registrations and/or changes of domain name ownership, for more frequent and thorough inspection. All suspicious findings discovered by the anti-phishing software module during searches may be reported to an investigative body, a server associated with the website and/or a server associated with the entity responsible for the anti-phishing software module. The report may prioritize the findings based on the amount of similarity found to the genuine website in each specific instance. For example, a website containing the genuine websites name, logo and the term "username" may be reported with higher importance than a website that only contains the genuine website's name.

According to yet further embodiments of the present invention, the anti-phishing software module may regularly scan emails to search for possible attempts to masquerade as the commercial entity being protected.

According to some embodiments of the present invention, the anti-phishing software module and/or the anti-trojan software module may be adapted to remain dormant much of the time and to wakeup intermittently. Whereas according to other embodiments of the present invention, the anti-phishing software module and/or the anti-trojan software module may be active substantially continuously.

According to some further embodiments of the present invention, the anti-phishing software module, the anti-pharming software module and/or the anti-trojan software module may also report any findings of suspicious activity to an investigative body and may include in the reports information that may assist the investigative body in locating and taking action against the offending party. The anti-phishing software module, the anti-pharming software module and/or the anti-trojan software module may be further adapted to take automatic action to prevent or halt security breach attempts when specific threats are detected.

Figure 3:
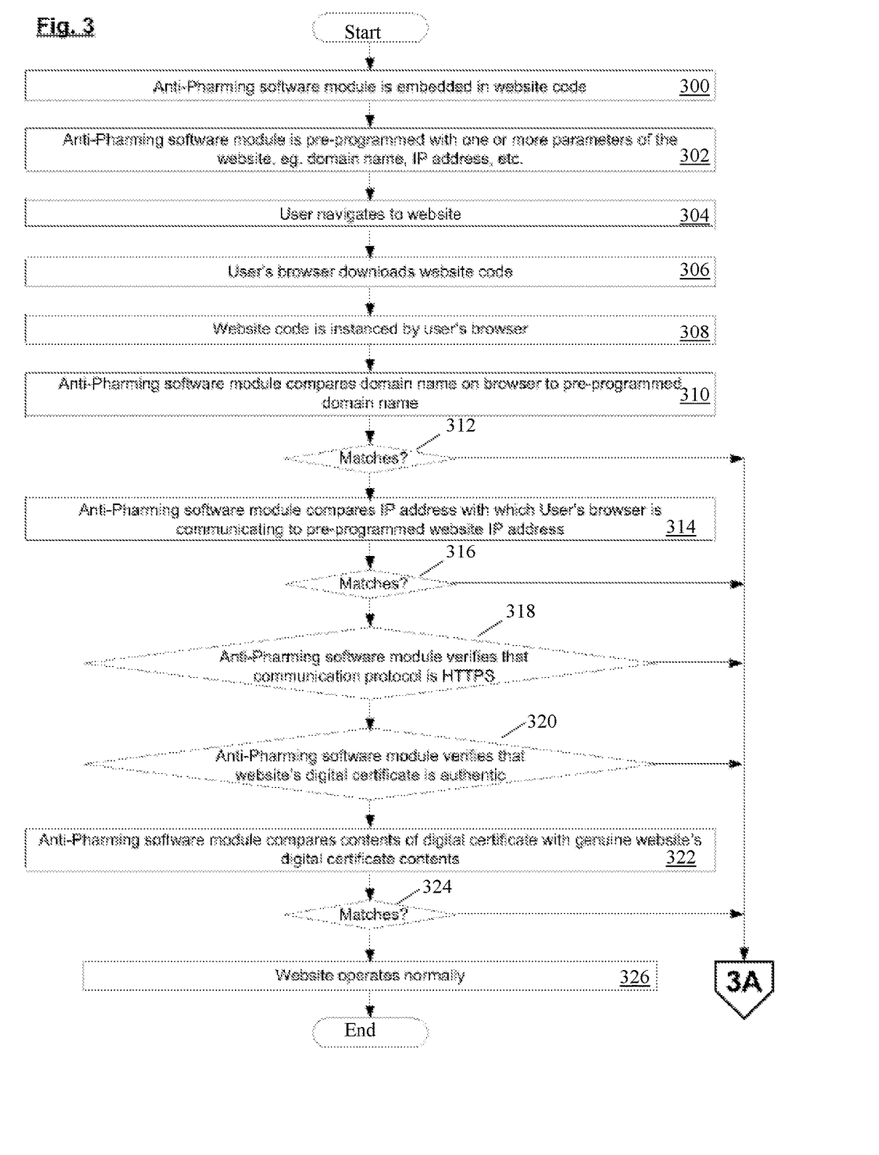
FIGS. 3+3A: show flowcharts including exemplary steps of operation of an anti-pharming software module, in accordance with some embodiments of the present invention.
Figure 3A:
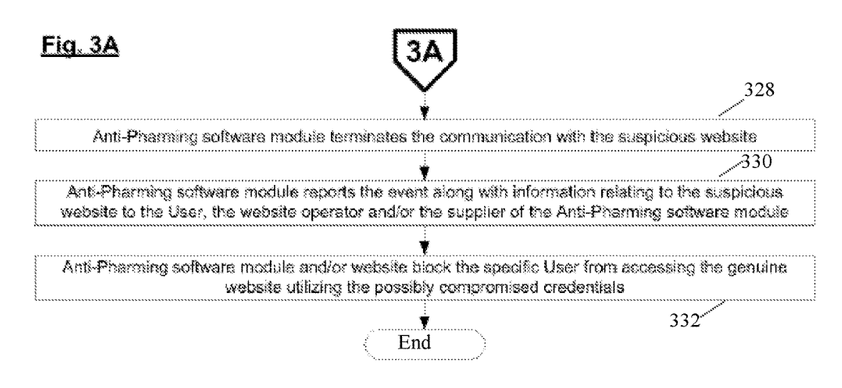

Referring to steps 300-326 of FIG. 3 and steps 328-332 of FIG. 3A, according to further embodiments of the present invention, an anti-pharming software module may be functionally associated with a website's code, such as embedded in a website's code. The anti-pharming software module, when instanced in a web browser, may be adapted to detect, report and/or prevent an attempt to intercept data transferred from a user to the website, including authentication data. A given anti-pharming software module may include, be pre-programmed with and/or otherwise have access to one or more parameters (e.g. domain name, IP address, etc) of the website with which the module is associated. When the given module is instanced, it may check and/or compare one or more parameters of the web site with which the user's browser is communicating against the one or more parameters of the website with which the module is associated. The module may thus determine whether the user's browser is communicating with the intended website, or whether the browser's communication is being redirected, intercepted or relayed, without the user's knowledge, to pass through a second website, presumably being operated by a third party (e.g. hostile entity), before being transmitted to the genuine website.

The anti-pharming software module may check, for example, that the domain name which appears in the user's browser is identical to the genuine website's domain name and/or that the IP address associated by the user's browser with the domain name is the genuine website's IP address. The anti-pharming software module may also verify that the protocol being used for communication is a Hypertext Transfer Protocol Secure (HTTPS). The anti-pharming software module may further verify the authenticity of the digital certificate being presented to the user's browser by the website with which it is communicating. The anti-pharming software module may further examine the content of the digital certificate to verify that it is actually the genuine website's certificate.

According to some embodiments of the present invention, the anti-pharming software module, in the event that it detects any discrepancy in the parameters it has checked and/or compared, may be adapted to; (i) terminate the communication; (ii) report the event along with any information relating to the second website, such as the domain name, IP address, etc., to the user, website operator and/or supplier of the anti-pharming software module; and/or (iii) block the specific user from accessing the system utilizing the credentials that may have been compromised.

Figure 4:
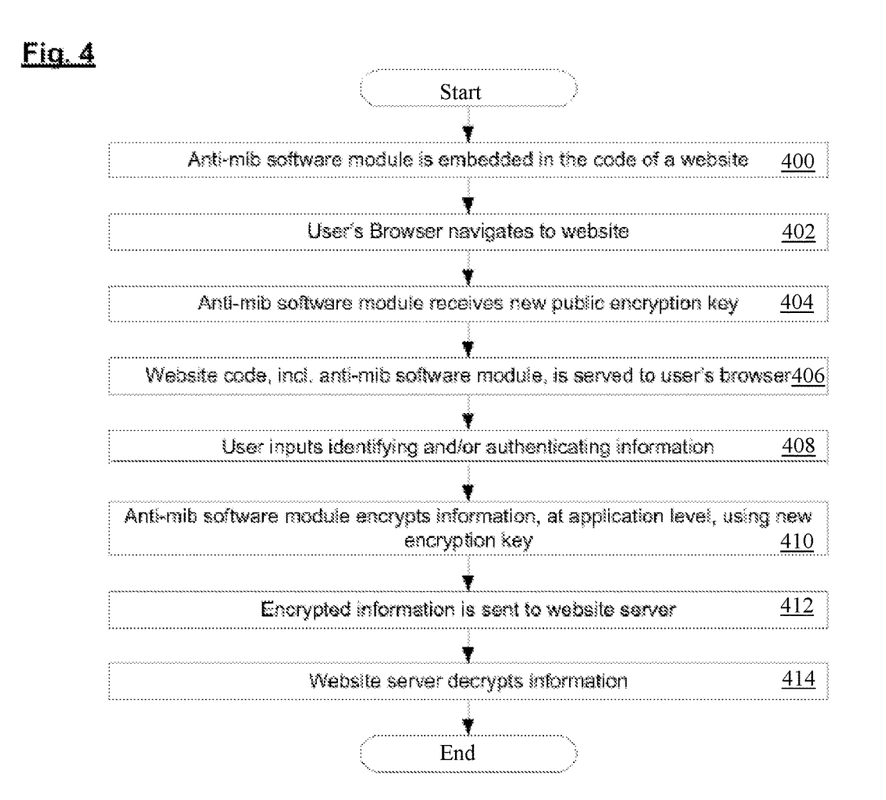
FIG. 4: shows a flowchart including exemplary steps of operation of an anti-mib software module, in accordance with some embodiments of the present invention.

Referring to steps 400-414 of FIG. 4, according to yet further embodiments of the present invention, an anti-mib (i.e. man in the browser) software module may be functionally associated with a website's code, such as embedded in a website's code. When instanced in a browser, the anti-mib module may request or otherwise receive an encryption key (e.g. a public encryption key) from a source associated with the website. The anti-mib module may use the key for application level encryption of information (e.g. identification and/or authentication information) provided by a user. The application may be a website log in application running on the browser and may be functionally associated or integral with the anti-mib module. The website may use a private key corresponding to the received (public) key to decrypt the user's information. According to further embodiments of the present invention, a different encryption key may be provided to the anti-mib module periodically and/or each time it is instanced. The different encryption key may be received by the anti-mib software module upon being served to or upon instancement on a client browser. Alternatively, the different encryption key may be created by the anti-mib software module upon being served to or upon instancement on a client browser. According to some embodiments of the present invention, the anti-mib module mitigates the risk of another application running within the browser from intercepting, storing and/or forwarding user information.

It should be understood by one of skill in the art that some of the functions described as being performed by a specific component of the system may be performed by a different component of the system in other embodiments of this invention.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. It should be recognized, however, that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A website security method implemented by a network system comprising one or more client devices and server devices, the method comprising:
   receiving a request from a client device for a web page to be provided by a server application, wherein anti-trojan software code is embedded in the requested web page and the anti-trojan software code is functionally associated with the server application and comprises one or more expected communication parameters;
   sending the requested web page to the client device responsive to the request, wherein the anti-trojan software code is configured to:
      intercept a subsequent request resulting from an interaction with the requested web page,
      extract one or more communication parameters contained within the intercepted subsequent request,
      compare the extracted communication parameters with the expected communication parameters, wherein the expected communication parameters comprise communication parameters of different types of possible communications expected by the server application in connection with requests to the server application, and
      determine a potential client security breach exists when one or more of the extracted communication parameters do not match one or more of the expected communication parameters;
   initiating a mitigation action when an indication is received from the executing anti-trojan software code that a potential security breach exists; and
   responding to the subsequent request from the client device by providing a requested resource when no indication is received from the executing anti-trojan software code that a potential security breach exists.

2. The method according to claim 1, wherein the mitigation action comprises at least one of terminating a communication session with the client device, sending a warning message to one or more of the client device, a website administrator or an anti-trojan software module service provider, or temporarily blocking a user of the client device from making further subsequent requests and providing remediation instructions intended for the user of the client device to re-enable access for sending the further subsequent requests.

3. The method according to claim 1, wherein the expected communication parameters comprise one or more of a response size, a response format, a number of user inputs, or response contents.

4. An apparatus, comprising memory comprising programmed instructions stored thereon and one or more processors configured to be capable of executing the stored programmed instructions to:
receive a request from a client device for a web page to be provided by a server application, wherein anti-trojan software code is embedded in the requested web page and the anti-trojan software code is functionally associated with the server application and comprises one or more expected communication parameters;
send the requested web page to the client device responsive to the request, wherein the anti-trojan software code is configured to:
intercept a subsequent request resulting from an interaction with the requested web page,
extract one or more communication parameters contained within the intercepted subsequent request,
compare the extracted communication parameters with the expected communication parameters, wherein the expected communication parameters comprise communication parameters of different types of possible communications expected by the server application in connection with requests to the server application, and
determine a potential client security breach exists when one or more of the extracted communication parameters do not match one or more of the expected communication parameters;
receive the notification from the client device and initiate a mitigation action when an indication is received from the executing anti-trojan software code that a potential security breach exists; and
responding to the subsequent request from the client device by providing a requested resource when no indication is received from the executing anti-trojan software code that a potential security breach exists.

5. The apparatus according to claim 4, wherein the mitigation action comprises at least one of terminating a communication session with the client device, sending a warning message to one or more of the client device, a website administrator or an anti-trojan software module service provider, or temporarily blocking a user of the client device from making further subsequent requests and providing remediation instructions intended for the user of the client device to re-enable access for sending the further subsequent requests.

6. The apparatus according to claim 4, wherein the expected communication parameters comprise one or more of a response size, a response format, a number of user inputs, or response contents.

7. A non-transitory computer readable medium having stored thereon instructions for website security comprising machine executable code which when executed by at least one processor, causes the processor to:
receive a request from a client device for a web page to be provided by a server application, wherein anti-trojan software code is embedded in the requested web page and the anti-trojan software code is functionally associated with the server application and comprises one or more expected communication parameters;
send the requested web page to the client device responsive to the request, wherein the anti-trojan software code is configured to:
intercept a subsequent request resulting from an interaction with the requested web page,
extract one or more communication parameters contained within the intercepted subsequent request,
compare the extracted communication parameters with the expected communication parameters, wherein the expected communication parameters comprise communication parameters of different types of possible communications expected by the server application in connection with requests to the server application, and
determine a potential client security breach exists when one or more of the extracted communication parameters do not match one or more of the expected communication parameters;
receive the notification from the client device and initiate a mitigation action when an indication is received from the executing anti-trojan software code that a potential security breach exists; and
responding to the subsequent request from the client device by providing a requested resource when no indication is received from the executing anti-trojan software code that a potential security breach exists.

8. The non-transitory computer readable medium according to claim 7, wherein the mitigation action comprises at least one of terminating a communication session with the client device, sending a warning message to one or more of the client device, a website administrator or an anti-trojan software module service provider, or temporarily blocking a user of the client device from making further subsequent requests and providing remediation instructions intended for the user of the client device to re-enable access for sending the further subsequent requests.

9. The non-transitory computer readable medium according to claim 7, wherein the expected communication parameters comprise one or more of a response size, a response format, a number of user inputs, or response contents.

10. A network system, comprising one or more client devices and server devices, the network system comprising memory comprising programmed instructions stored thereon and one or more processors configured to be capable of executing the stored programmed instructions to:
receive a request from a client device for a web page to be provided by a server application, wherein anti-trojan software code is embedded in the requested web page and the anti-trojan software code is functionally associated with the server application and comprises one or more expected communication parameters;
send the requested web page to the client device responsive to the request, wherein the anti-trojan software code is configured to:
intercept a subsequent request resulting from an interaction with the requested web page,
extract one or more communication parameters contained within the intercepted subsequent request,
compare the extracted communication parameters with the expected communication parameters, wherein the expected communication parameters comprise communication parameters of different types of possible communications expected by the server application in connection with requests to the server application, and determine a potential client security breach exists when one or more of the extracted communication parameters do not match one or more of the expected communication parameters;

receive the notification from the client device and initiate a mitigation action when an indication is received from the executing anti-trojan software code that a potential security breach exists; and respond to the subsequent request from the client device by providing a requested resource when no indication is received from the executing anti-trojan software code that a potential security breach exists.

11. The system as set forth in claim 10, wherein the mitigation action comprises at least one of terminating a communication session with the client device, sending a warning message to one or more of the client device, a website administrator or an anti-trojan software module service provider, or temporarily blocking a user of the client device from making further subsequent requests and providing remediation instructions intended for the user of the client device to re-enable access for sending the further subsequent requests.

12. The system as set forth in claim 10, wherein the expected communication parameters comprise one or more of a response size, a response format, a number of user inputs, or response contents.

* * * * *